US007039637B2

(12) United States Patent
Murray et al.

(10) Patent No.: US 7,039,637 B2
(45) Date of Patent: *May 2, 2006

(54) SYSTEM AND METHOD FOR EVALUATING CHARACTERS IN AN INPUTTED SEARCH STRING AGAINST A CHARACTER TABLE BANK COMPRISING A PREDETERMINED NUMBER OF COLUMNS THAT CORRESPOND TO A PLURALITY OF PRE-DETERMINED CANDIDATE CHARACTER SETS IN ORDER TO PROVIDE ENHANCED FULL TEXT SEARCH

(75) Inventors: Brendan P. Murray, Marblehead, MA (US); Kuniaki Takizawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 09/384,088

(22) Filed: Aug. 27, 1999

(65) Prior Publication Data

US 2003/0009447 A1    Jan. 9, 2003

Related U.S. Application Data

(60) Provisional application No. 60/114,574, filed on Dec. 31, 1998.

(51) Int. Cl.
 *G06F 17/30* (2006.01)
(52) U.S. Cl. .............. 707/6; 707/1; 707/102; 382/229; 715/536; 704/1; 704/9
(58) Field of Classification Search ............. 707/1–9, 707/100–104.1, 200–205, 501.1, 511–515, 707/531–532, 536–535; 704/8–10, 5, 1; 703/27; 706/11, 45, 58; 345/716, 741, 968, 345/551; 708/207, 671; 340/146.2; 382/229; 715/536
See application file for complete search history.

(56) References Cited

U.S. PATENT DOCUMENTS 4,289,411 A    9/1981 Cornelius et al. .............. 347/5

(Continued)

FOREIGN PATENT DOCUMENTS

EP    457705    *    4/1991    .................. 15/40

(Continued)

OTHER PUBLICATIONS

Ricardo Baeza-Yates et al. "A new approach to text searching", communications of the ACM, vol. 35, issue 10, Oct. 1992, pp 74-82.*

(Continued)

*Primary Examiner*—Srirama Channavajjala
(74) *Attorney, Agent, or Firm*—Pillsbury Winthrop Shaw Pittman LLP

(57)    ABSTRACT

An evaluator system accepts input textual messages in unknown languages and assesses which character sets, corresponding to languages, matches that message. Textual messages whose individual characters are encoded in 16 bit Unicode or other universal format are parsed, and character sets which can express each character and the accumulated correspondence is logged. When the character sets against which the message is being tested only provide partial matches, the invention can determine which offers the best fit, including by means of a weighting function. The evaluation technology of the invention can be applied to multipart documents, and to search engines and indices. Documents can be indexed according to assigned character sets, and quary strings matched to indices according to language.

37 Claims, 7 Drawing Sheets

U.S. PATENT DOCUMENTS

| | | | | |
|---|---|---|---|---|
| 4,428,694 A | | 1/1984 | Ragen | 400/166.2 |
| 4,456,969 A | | 6/1984 | Herzik et al. | 707/533 |
| 4,777,617 A | | 10/1988 | Frisch et al. | 704/8 |
| 4,873,634 A | | 10/1989 | Frisch et al. | 707/533 |
| 4,907,194 A | * | 3/1990 | Yamada et al. | 365/49 |
| 5,009,276 A | | 4/1991 | Raikes et al. | 177/25.15 |
| 5,136,289 A | * | 8/1992 | Yoshida et al. | 341/67 |
| 5,165,014 A | | 11/1992 | Vassar | 358/1.13 |
| 5,222,200 A | | 6/1993 | Callister et al. | 358/1.13 |
| 5,377,280 A | | 12/1994 | Nakayama | 382/229 |
| 5,377,349 A | * | 12/1994 | Motomura | 707/7 |
| 5,392,419 A | | 2/1995 | Walton | 204/298.28 |
| 5,418,718 A | | 5/1995 | Lim et al. | 707/536 |
| 5,438,650 A | | 8/1995 | Motoyama et al. | 358/1.15 |
| 5,495,577 A | | 2/1996 | Davis et al. | 395/144 |
| 5,500,931 A | | 3/1996 | Sonnenschein | 707/529 |
| 5,506,940 A | | 4/1996 | Bamford et al. | 358/1.11 |
| 5,526,469 A | | 6/1996 | Brindle et al. | 358/1.9 |
| 5,548,507 A | | 8/1996 | Martino et al. | 704/1 |
| 5,586,288 A | * | 12/1996 | Dahlberg | 711/108 |
| 5,659,770 A | | 8/1997 | Yamada | 707/530 |
| 5,706,413 A | | 1/1998 | Takabayashi et al. | 358/1.11 |
| 5,717,840 A | | 2/1998 | Pardo | 358/1.13 |
| 5,754,748 A | | 5/1998 | Rivers et al. | 358/1.17 |
| 5,771,034 A | | 6/1998 | Gibson | 345/141 |
| 5,778,213 A | * | 7/1998 | Shakib et al. | 703/27 |
| 5,778,361 A | * | 7/1998 | Nanjo et al. | 707/5 |
| 5,778,400 A | * | 7/1998 | Tateno | 707/513 |
| 5,793,381 A | * | 8/1998 | Edberg et al. | 345/467 |
| 5,802,539 A | | 9/1998 | Daniels | 707/542 |
| 5,805,881 A | * | 9/1998 | Kiuchi et al. | 705/30 |
| 5,812,818 A | | 9/1998 | Adler et al. | 703/23 |
| 5,819,303 A | | 10/1998 | Calhoun | 707/530 |
| 5,828,817 A | | 10/1998 | Landau | 358/1.13 |
| 5,841,376 A | * | 11/1998 | Hayashi | 341/51 |
| 5,844,991 A | | 12/1998 | Hochberg et al. | 382/218 |
| 5,859,648 A | | 1/1999 | Moore et al. | 345/471 |
| 5,873,111 A | | 2/1999 | Edberg | 707/536 |
| 5,946,648 A | * | 8/1999 | Halstead, Jr. et al. | 704/9 |
| 6,023,528 A | | 2/2000 | Froessl | 382/181 |
| 6,031,622 A | | 2/2000 | Ristow et al. | 358/1.11 |
| 6,073,147 A | | 6/2000 | Chan et al. | 707/542 |
| 6,081,804 A | * | 6/2000 | Smith | 707/3 |
| 6,098,071 A | * | 8/2000 | Aoyama et al. | 707/102 |
| 6,138,086 A | | 10/2000 | Rose et al. | 704/8 |
| 6,141,656 A | * | 10/2000 | Ozbutun et al. | 707/10 |
| 6,144,934 A | * | 11/2000 | Stockwell et al. | 704/1 |
| 6,157,905 A | | 12/2000 | Powell | 704/2 |
| 6,167,369 A | | 12/2000 | Schulze | 704/9 |
| 6,216,102 B1 | | 4/2001 | Martino et al. | 704/9 |
| 6,240,186 B1 | | 5/2001 | Hyde et al. | 380/255 |
| 6,252,671 B1 | | 6/2001 | Peng et al. | 358/1.11 |
| 6,321,192 B1 | * | 11/2001 | Houchin et al. | 704/9 |
| 6,643,647 B1 | * | 11/2003 | Natori | 707/6 |
| 6,718,519 B1 | | 4/2004 | Taieb | 715/542 |
| 6,785,677 B1 | * | 8/2004 | Fritchman | 707/6 |
| 6,813,747 B1 | | 11/2004 | Taieb | 715/542 |
| 2001/0019329 A1 | | 9/2001 | Kobayashi | 345/467 |
| 2001/0020243 A1 | | 9/2001 | Koppolu et al. | 707/513 |
| 2002/0136458 A1 | * | 9/2002 | Nagasaka et al. | 382/209 |
| 2004/0190526 A1 | * | 9/2004 | Kumar et al. | 370/395.21 |

FOREIGN PATENT DOCUMENTS

| | | | | | |
|---|---|---|---|---|---|
| EP | | 886228 | * | 12/1998 | 17/60 |
| EP | | 1056024 | * | 11/2000 | 17/30 |
| WO | WO | 92/15067 | * | 9/1992 | 15/415 |
| WO | WO | 01/20500 | * | 3/2001 | 17/30 |
| WO | WO | 02/01400 A1 | * | 1/2002 | 17/20 |

OTHER PUBLICATIONS

Alfred V Aho et al., "efficient string matching: an aid to bibiographic search", Communications of the ACM, vol. 18, No. 6, Jun. 1975, pp 333-340.*

Paolo Ferragina et al. "Fast string searching in secondary storage:theoretical developments and experimental results", symposium on discrete algoithms, proceedings of the seventh annual ACM-SIAM symposium on discrete algorithms, 1996, pp 373-382.*

U.S. Appl. No. 09/384,089, David D. Taieb, filed Aug. 27, 1999.

U.S. Appl. No. 09/384,371, Brendan P. Murray et al., filed Aug. 27, 1999.

U.S. Appl. No. 09/384,442, Brendan P. Murray et al., filed Aug. 27, 1999.

U.S. Appl. No. 09/384,443, Brendan P. Murray et al., filed Aug. 27, 1999.

U.S. Appl. No. 09/384,538, David D. Taieb, filed Aug. 27, 1999.

U.S. Appl. No. 09/384,541, David D. Taieb, filed Aug. 27, 1999.

U.S. Appl. No. 09/384,542, David D. Taieb, filed Aug. 27, 1999.

Akira et al., "Viewing Multilingual Documents on your Local Web Browser", *Communications of the ACM*, vol. 41, No. 4, Apr. 1998, pp. 64-65.

Sakaguchi et al., "A Browsing Tool for Multi-Lingual Documents for Users without Multi-Lingual Fonts", University of Library and Information Science, copyright 1996, pp. 63-71.

Turnbull, "Alphabet Soup: 1 The Internationalization of Linux, Part 1", *Linux Journal*, vol. 1999, Issue 59es, Mar. 1999, (10 pages).

Turnbull, "Alphabet Soup: 2 the Internationalization of Linux, Part 2", *Linux Journal*, vol. 1999, Issue 60es, Apr. 1999, (10 pages).

Au, "Hello, World! A Guide for Transmitting Multilingual Electronic Mail", *Proceedings of the 23rd ACM SIGUCCS Conference on Winning the Networking Game*, St. Louis, MO, User Service Conference, 1995, pp. 35-39.

* cited by examiner

1st CALL: STOP AT 950
RET SET = JAPANESE
(CHARSETMATCHLIST)
MATCH STATUS = FAILED

2nd CALL: STOP AT 1000
RET SET = KOREAN
(CHARSETMATCHLIST)
MATCH STATUS = SUCCESS

Unicode's encoding layout

SYSTEM AND METHOD FOR EVALUATING CHARACTERS IN AN INPUTTED SEARCH STRING AGAINST A CHARACTER TABLE BANK COMPRISING A PREDETERMINED NUMBER OF COLUMNS THAT CORRESPOND TO A PLURALITY OF PRE-DETERMINED CANDIDATE CHARACTER SETS IN ORDER TO PROVIDE ENHANCED FULL TEXT SEARCH

CROSS REFERENCE TO RELATED APPLICATIONS

This application claims priority from, and incorporates by reference, U.S. Provisional application Ser. No. 60/114,574 filed Dec. 31, 1998. The subject matter of this application is related to the subject matter of concurrently filed U.S. patent application Ser. Nos. 09/384,371, 09/384,541 and 09/384,443, entitled "System and Method for Evaluating Character Sets to Determine a Best Match Encoding a Message", "System and Method for Using Character Set Matching to Enhance Print Quality,38 and "System and Method for Evaluating Character Sets," respectively, each having the same inventors and being assigned or under obligation of assignment to the same assignee as the present application, and each incorporated by reference. The subject matter of this application is also related to the subject matter of concurrently filed U.S. Pat. Nos. 6,539,118, 6,718,519, 6,813,747, and 6,760,887, entitled "System and Method for Evaluating Character Sets of a Message Containing a Plurality of Character Sets," "System and Method for Outputting Character Sets in Best Available Fonts," "System and Method for Output of Multipart Documents" and "System and Method for Highlighting of Multifont Documents," respectively, each having the same inventors and being assigned or under obligation of assignment to the same assignee as the present application, and each incorporated by reference.

FIELD OF THE INVENTION

The invention relates to the field of information processing, and more particularly to the matching of candidate character sets to the intended language of an electronic message for purposes of database searching.

BACKGROUND OF THE INVENTION

With the use of the Internet, email and related electronic services, communications software has been increasingly called upon to handle data in a variety of formats. While the barriers to simple communications have been removed from many hardware implementations, the problem of operating system or application software being unable to display text in different languages remains.

For instance, a person browsing the World Wide Web may wish to input a search string in their native language. Some Web pages or search engines will simply accept that string in the form in which it was input, but not process the spelling, syntax or character set in native form. The search engine then performs a search as though the search were in English, usually resulting in no hits. Other Web pages may allow a user to manually specify the desired language for browsing and searching. There is a need for more robust and more highly automated language handling for general searching, messaging and other communications purposes.

SUMMARY OF THE INVENTION

The invention overcoming these and other problems in the art relates to a system and method whereby electronic messages coded in a universal character set such as Unicode or others can be reliably and accurately transmitted using standard conventional encoding methods over the Internet or other networks. The encoded documents may be in MIME (Multipurpose Internet Mail Extensions), STMP, HTML, XML or other formats.

An object of the invention is to provide an automatic and rigorous language evaluation facility by which the content of a message represented in a universal character set is tested against a bank of available language character sets, to determine which if any of those candidate languages can express the message.

Another object of the invention is to provide a system and method for evaluating character sets which identify languages which are capable of expressing the message from the language bank, to present to a user or otherwise.

Another object of the invention is to provide a system and method for evaluating character sets which assign a rating to languages which can express a given message, to determine which of those candidate languages offers the best fit to express the message.

Another object of the invention is to provide a system and method for evaluating a character set which permit searching and reading of text expressions in their native character sets, improving the quality of search results.

The system and method of the invention accomplishing these and other objects employs a character table bank against which the ability of a number of character sets, representing different languages, to encode a given character is tested. When a message of unknown origin is presented to the system, its characters are parsed and tested against the character table bank to separate the character sets (hence languages) to identify which of the pool of character sets can express each character.

A character set which contains a match for every character of the message is likely to be the native language of the original message. Tallies of matches to individual characters across all available character sets in the character table bank can also be made for the message as a whole. The invention has been implemented in and will be described in one regard with respect to the Lotus Notes™ environment, but it will be understood that the invention has universal application and can be used in any system that needs to receive and display information in multiple languages.

BRIEF DESCRIPTION OF THE DRAWINGS

The invention will be described with respect to the accompanying drawings, in which like elements are referenced with like numbers and in which.

DETAILED DESCRIPTION OF THE DRAWINGS

Figure 1:
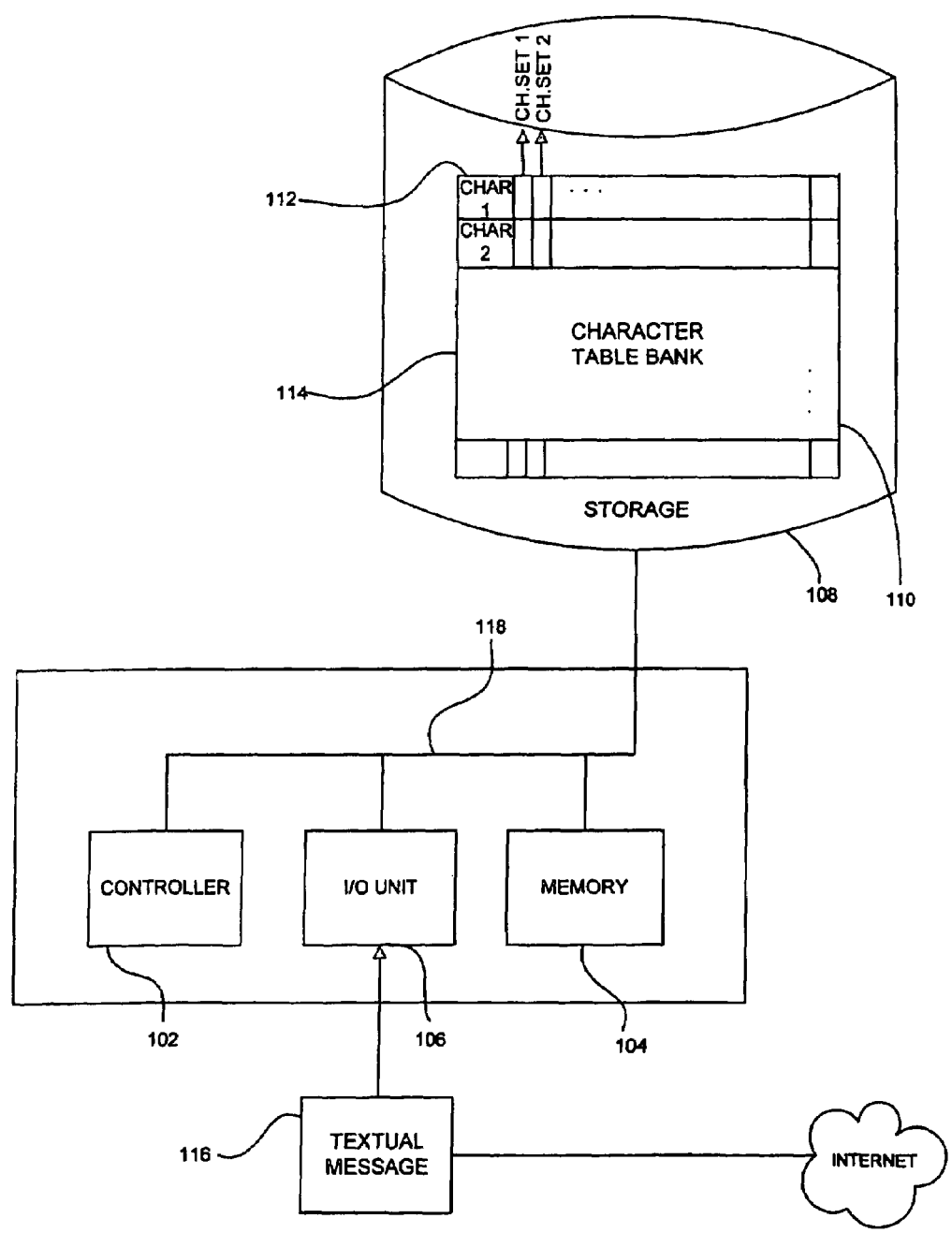
FIG. 1 illustrates a network architecture for evaluating the character sets of electronic messages according to the invention.

FIG. 1 illustrates a system for evaluating character sets according to the invention, in which a controller 102 is connected to an input/output unit 106, memory 104 (such as electronic random access memory) and storage 108 (such as a hard disk) over electronic bus 118, as will be appreciated by persons skilled in the art. Input/output unit 106 is configured to receive and transmit messages in electronic format, such as email or other textual forms. Controller 102 and associated components may be or include, for example, a personal computer running the Microsoft Windows™ 95, 98, NT™, Unix, Linux, Solaris™, OS/2™, BeOS, MacOS™ or other operating system.

Input/output unit 106 may be connected to the Internet (as shown) or other network interfaces, using or including as a segment any one or more of, for instance, the Internet, an intranet, a LAN (Local Area Network), WAN (Wide Area Network) or MAN (Metropolitan Area Network), a frame relay connection, Advanced Intelligent Network (AIN) connection, a synchronous optical network (SONET) connection, digital T1, T3 or E1 line, Digital Data Service (DDS) connection, DSL (Digital Subscriber Line) connection, an Ethernet connection, ISDN (Integrated Services Digital Network) line, a dial-up port such as a V.90, V.34 or V.34bis analog modem connection, a cable modem, an ATM (Asynchronous Transfer Mode) connection, FDDI (Fiber Distributed Data Networks) or CDDI (Copper Distributed Data Interface) connections. Input/output unit 106 may likewise be connected to a network interface using or including WAP (Wireless Application Protocol), GPRS (General Packet Radio Service), GSM (Global System for Mobile Communication) or CDMA (Code Division Multiple Access) radio frequency links, RS-232 serial connections, IEEE-1394 (Firewire) connections, USB (Universal Serial Bus) connections or other wired or wireless, digital or analog interfaces or connections. Input/output unit 106 can also receive input data directly from a keyboard, scanner or any other data source. Input/output unit 106 receives an textual electronic message 116 in character-based, alphanumeric textual form for processing according to the invention. The necessary processing is initiated and carried out by controller 102, in cooperation with memory 104, input/output unit 106, storage 110 and related components, according to the following.

Figure 7:
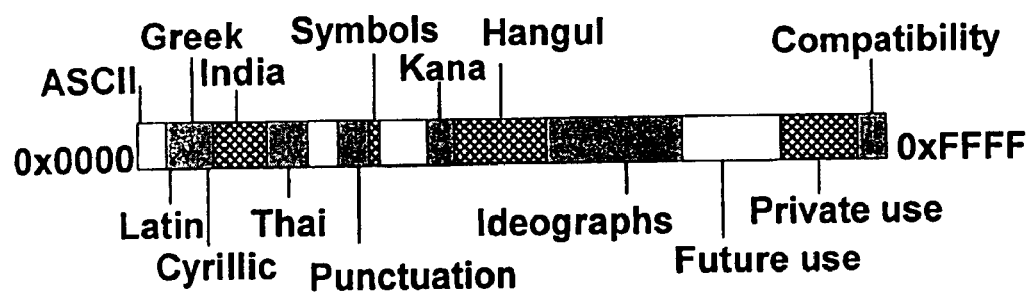
FIG. 7 illustrates character set encoding according to the Unicode standard.

It should be noted that the invention presupposes that the characters of textual message 116 are available internally in a universal character set format. A universal character set refers to a character encoding scheme that can be used to encode a large number of alphabets. The invention supports at least two universal character sets, the internationally promulgated 16-bit Unicode, and LMBCS (Lotus Multi-Byte Character Set) but contemplates the use of any universal encoding scheme. An illustration of the 16-bit format of Unicode is shown in FIG. 7. As in shown that figure, the Unicode standard assigns different address ranges within the 16 bit address space to different scripts, so that when a character code point (address) is known, it is straightforward using the Unicode and coding layout to identify a corresponding script. The script in this sense is a larger lingual object than a character set, and can include symbols used within multiple languages.

Thus, the low level bit values for each character in the textual message 116 are expected by the invention to be presented in a predetermined binary format, even if the actual language being used to express the textual message 116 built from those characters is not clear or known ahead of time.

The system and method of the invention executes at least four decoding functions upon receipt of a textual message 116 of unknown language. The first is feasibility, that is, the decision at the threshold whether the textual message can be encoded in at least one of the character sets 114 recorded in a character table bank 110 stored in storage 108. If the textual message 116 can not be translated to any available character set, processing must be returned to the user without results.

The invention in a second regard generates a quantified list of the coverage offered by each of the character sets in the bank (and their associated languages) for every character of the textual message 116. Third, when no single character set perfectly expresses the textual message 116, the invention identifies the character set(s) that provides the best available coverage for the character string contained in textual message 116.

The invention fourthly provides a division mechanism which accepts textual messages containing different portions in different languages that therefore cannot be encoded entirely in one character set, and encodes them in multiple parts. This encoding option can be used for instance in multipart MIME messages.

All of these feature sets may be implemented using machine readable code compatible with controller 102 to generate application programming interfaces (APIs) and associated functions operating on character table bank 110. Character table bank 110 contains information about each character supported by the pool of character sets used by the invention, encoded in Unicode or other universal code.

The character table bank 110 in one embodiment includes all the alphanumeric alphabets used in the languages of Western, Central and Eastern Europe, North and South America, the Middle East, Republic of China, Peoples' Republic of China, Japan, Korea, Thailand, Vietnam and India Character table bank 110 is extensible, and support for other languages can be added or others deleted. For those alphabets where multiple encodings are commonly in use, multiple entries can be created. For example, Western European character data can be encoded as ISO-8859-1 or Microsoft Windows™ codepage 1252. The particulars of those encoding standards are known in the art, including by way of standards published by the International Standards Organization.

Figure 3:
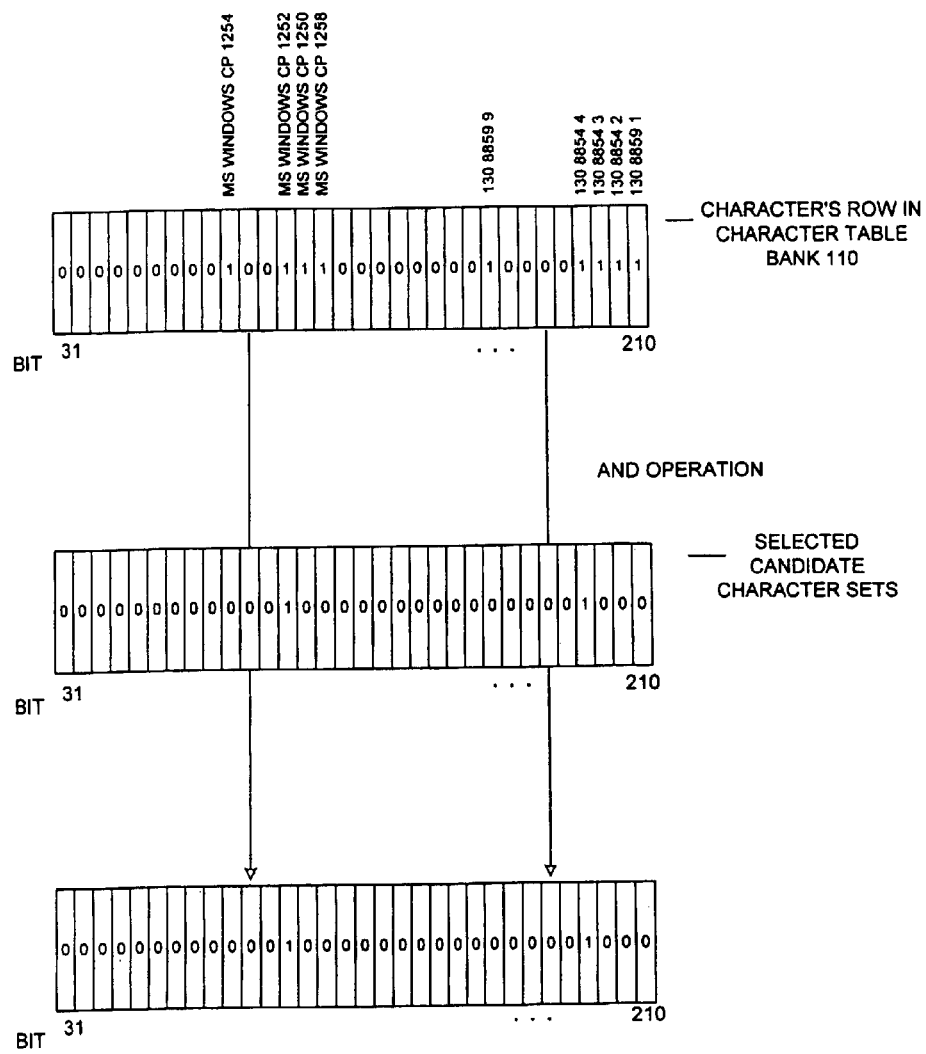
FIG. 3 illustrates the bit masking action used for testing character set matches according to the invention.

The format of character table bank 110, as illustrated for example in FIG. 3, is that each row represents an entry for one character contained in character field 112, the row being 32 bits wide. Across the row, each bit indicates whether the character contained in character field 112 for that row is contained in, and can be expressed by, a series of character sets. Each column of character table bank 110 represents one character set in predetermined sequence, and the bit value (Boolean true or false) in that column indicates whether the character set corresponding to that column can express the character which is the subject of that row.

In the first row of character table bank 110 illustrated in FIG. 1, the character is Á (Latin letter "A" with acute), and the first character field 112 represents ISO 8859-1 which is referred to as Latin-1, which is almost identical to MS Windows CP 1252 used in the Americas and Western Europe. (In other words, this encompasses English, Spanish, French, Portuguese, German, Dutch, Danish, Swedish, Norwegian, Italian, Finnish and some less widely used minority languages and variants such as Flemish, Catalan, Swiss German, etc.).

The second character field 112 represents ISO 8859-2, a.k.a. Latin-2, which is used to represent Central European languages: Polish, Czech, Slovak, Bulgarian, Slovenia, Croatian, Bosnian, Serbian, Macedonian and Romanian (some of these also have Cyrillic representations), and so forth. It will be noted that the character sets corresponding to each bit entry (column) in character field 112 need not strictly represent only the characters of a single language's alphabet, but can represent larger ensembles of several dialects or languages in an overall character set or script. For instance, the character set for the Korean language (ISO 2022-KR) contains Japanese characters, as a subset.

In the practice of the invention it is preferable that certain optimizations be performed on the character table bank 110. Those include encoding of the rows and columns of character table bank 110 for compression such as in hexadecimal format, for faster processing. Other encoding can be done for other desired properties such as faster processing or I/O (any of which can be done by appropriate conventional techniques).

ASCII data is also preferably excluded from character table bank 110, since all electronic document formats include this range as a subset. In other words, if the data can be encoded entirely in ASCII, they can be included in any and all other character set encodings. A further reason for excluding them is speed: a quick scan of the data can identify if the string can be encoded as ASCII without performing a look up against any tables. ASCII here refers to the set of characters described by the standard ISO 646 IRV. As noted, the illustrated embodiment is restricted to 32 bit wide rows, but this can be extended to 64 bits or other widths in different implementations.

Each character registered in the character field 112 of the character table bank 110 is encoded according to the character's Unicode code value. It is this value that is used to test an input letter or other character from electronic message 116 to identify matching character sets. For example, and as illustrated in FIG. 3, the character Á encoded in Unicode by value U+00C1 has an entry (logical 1) indicating that it is present in the following character sets, each set having a particular corresponding column:

TABLE 1

| Character Set | Bit Number |
|---|---|
| ISO-8859-1 | 0 |
| ISO-8859-2 | 1 |
| ISO-8859-3 | 2 |
| ISO-8859-4 | 3 |
| ISO-8859-9 | 8 |
| MS Windows CP 1258 | 17 |
| MS Windows CP 1250 | 18 |
| MS Windows CP 1252 | 19 |
| MS Windows CP 1254 | 22 |

As shown in FIG. 3, this results in a pattern of 32 bits of (little endian):

0000 0000 0100 1110 0000 0001 0000 1111 which is recorded as the entry across the first row of character table bank 110.

Figure 2:
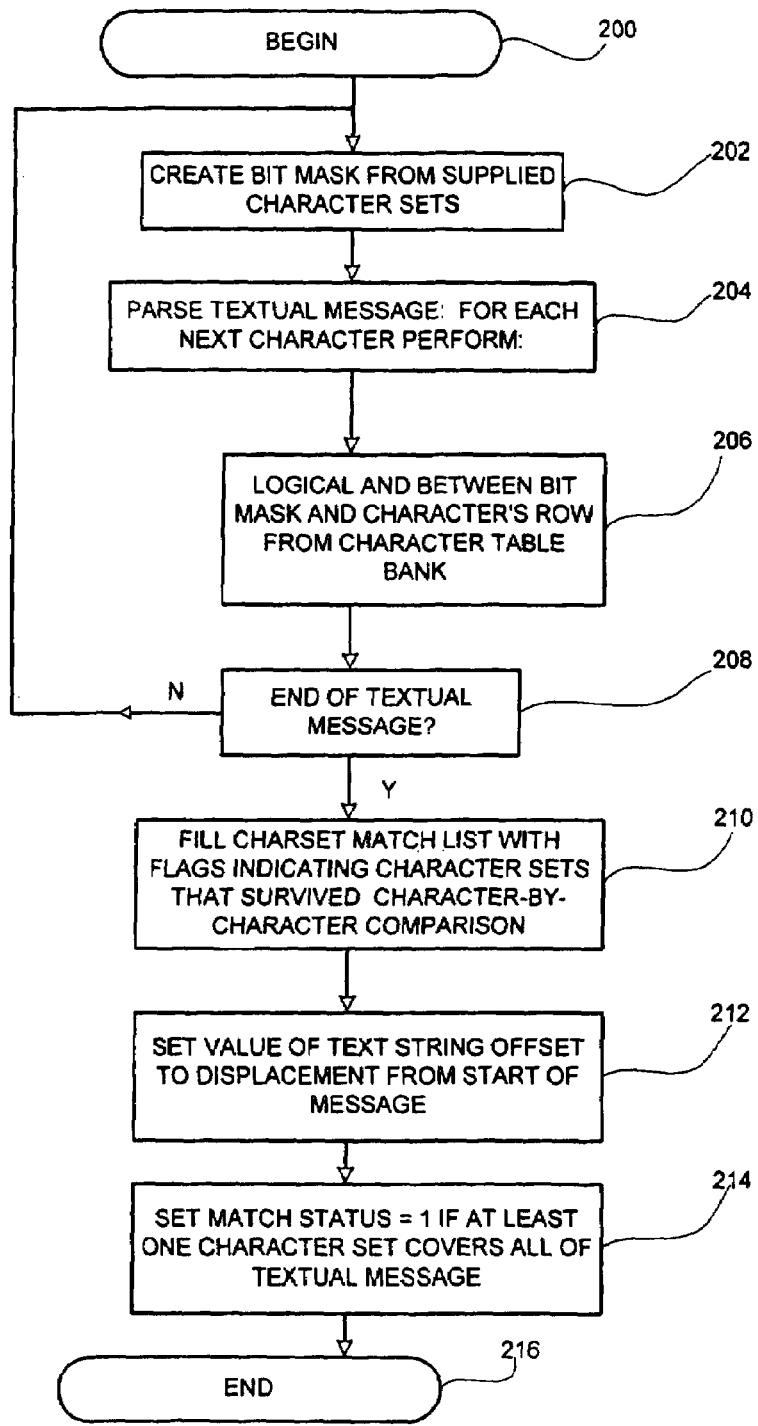
FIG. 2 is a flowchart illustrating character set processing according to a first embodiment of the invention.

In one aspect of the invention illustrated in FIG. 2, upon receipt of an electronic message 116 the invention must determine at the threshold whether it is possible to express the characters making up the message in any of the available character sets stored in character table bank 110. The invention carries out this treatment according to the following processing steps, illustrated by the following generalized pseudocode (API):

TABLE 2

Funct EvaluateTextMessage:(TextString, TextStringLength, CharSetTestList, CharSetMatchList, TextStringOffsetPosition, MatchStatus)

The foregoing arguments or parameters in general relate to:
TextString: Contains the textual message to be tested.
TextStringLength: The length of the string, in bytes or characters, or an indication that the textual message is NULL-terminated.
CharSetTestList: A list of character sets against which the textural message is to be matched. The number of character sets in the list is determined by a terminator mark.
CharSetMatchList: An empty list in which the number of matching results are stored.
TextStringOffsetPosition: An offset initialized to zero where the function returns the position in the string if the scan fails.
MatchStatus: a boolean value indicating whether all characters were matched (logical 1, success) or less than all were matched (logical 0, failure).

The function EvaluateTextMessage invokes the following processing steps, as illustrated in FIG. 2. It may be noted that the character sets against which the electronic textual message 116 will be tested need not include all available character sets in character table bank 110, but can be any selected group of character sets passed in the CharSetTestList parameter.

Processing begins in step 200. In step 202, a bit mask is created from the character sets supplied in the CharSetTestList parameter. This mask is in the same columnar format as the character table bank 110; that is, the desired candidate character sets have corresponding masks (logical value 1) in their assigned columns, as illustrated in FIG. 3.

In step 204, the parsing of textual message 116 is begun. For each character in the textual message, a logical AND is performed between the supplied character sets' bit mask and the value returned from the character's row of the character table bank 110. This process is repeated until the termination test of step 208 is met. That test is whether either the end of the textual message 116 has been reached, or the result of the mask is zero, indicating that the candidate character sets cannot represent any more of the textual message 116.

In step 210 the CharSetMatchList parameter is filled with logical values flagging the character sets that survived the character-by-character scan for the entire textual message 116. In step 212 the current position in the textual message 116 (displacement from the start of the message) is placed in the TextStringOffset parameter to return. Finally, in step 214 the MatchStatus parameter is set to return and indicate success (the entire textual message could be encoded) or failure (less than all of the textual message could be encoded). In step 216 processing ends.

The returned list of matching character sets in CharSetMatchList is in the same order in which they were specified to the function EvaluateTextMessage, retaining their implicit priority. Controller 102 may then operate to present the list of matching character sets to a user for selection, if desired. As a preferable option, if the string contains only characters that can be encoded in ASCII, this character set is returned as the first in the list, even if it was not explicitly included in the input list. ASCII is returned for similar reasons as noted above: if the data are all ASCII, any encoding can be used. (In the Lotus Notes™ environment discussed below this is an indication that the standard MIME designation of US-ASCII is to be used).

Note that the TextStringOffset parameter must be initialized to zero. This means that the function EvaluateTextMessage can be called several times with the offset parameter automatically being advanced. This has the desirable effect in one embodiment of splitting a multilingual document into multiple MIME text parts.

Figure 4:
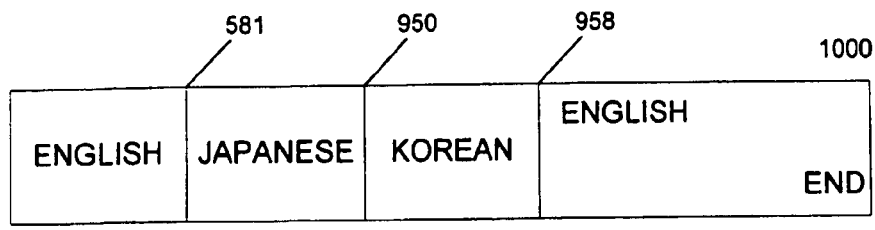
FIG. 4 illustrates a multipart, multilanguage document for processing according to the invention.

For example, as illustrated in FIG. 4 assume we have a multilingual document containing the following textual segments:

| Position | Character Set (Language) |
|---|---|
| offset 0 | English |
| offset 581 | Japanese |
| offset 950 | Korean |
| offset 958 | English |
| offset 1000 | (end) |

Assume that parameter CharSetTestList contains the entries ISO-2022-JP, ISO-2022-KR and US-ASCII. (Under the ISO standards, since all character sets support ASCII, this implies that the Japanese and Korean character sets also support English). Then the first call for the function EvaluateTextMessage (with TextStringOffset=0) stops at offset 950, with the CharSetMatchList set equal to ISO-2022-JP, and the MatchStatus return value as failed. This is because no given character set can represent all of the characters of English, Japanese and Korean at the same time.

Calling the function again without resetting the TextStringOffset and with the same input character set test list results in the CharSetMatchList being returned as ISO-2022-KR for the next segment of textual message 116, since Korean is a superset of Japanese. The offset at this juncture is 1000 (the end) and the MatchStatus flag is set to success. In cases where the MatchStatus flag returns a failure, the calling resource can default to choose Unicode as the encoding method for the textual message 116.

In another embodiment of the invention, it may be desirable to develop more detailed quantitative information concerning the degree of overlap of different character sets to the characters of the textual message 116. A corresponding API is presented in the following table, which differs from the functionality above in Table 2 in that it returns the number of characters that can be encoded in each of the partially matching character sets.

TABLE 3

Funct EvaluateTextMessageWithCount: (TextString, TextStringLength, CharSetTestList, CharSetCountList, TextStringOffsetPosition, FullMatch)

The foregoing arguments in general relate to:
TextString: Contains the textual message to be tested.
TextStringLength: The length of the string, in bytes or characters, or an indication that the textual message is NULL-terminated.
CharSetTestList: A list of character sets against which the textural message is to be matched. The number of character sets in the list is determined by a terminator mark.
CharSetCountList: An empty list in which the accumulated match results are stored, one-to-one with the supplied list of test character sets.
TextStringOffsetPosition: An offset initialized to zero where the function returns the position in the string if the scan fails.
FullMatch: a boolean value indicating whether all characters were matched or less than all were matched.

Figure 5:
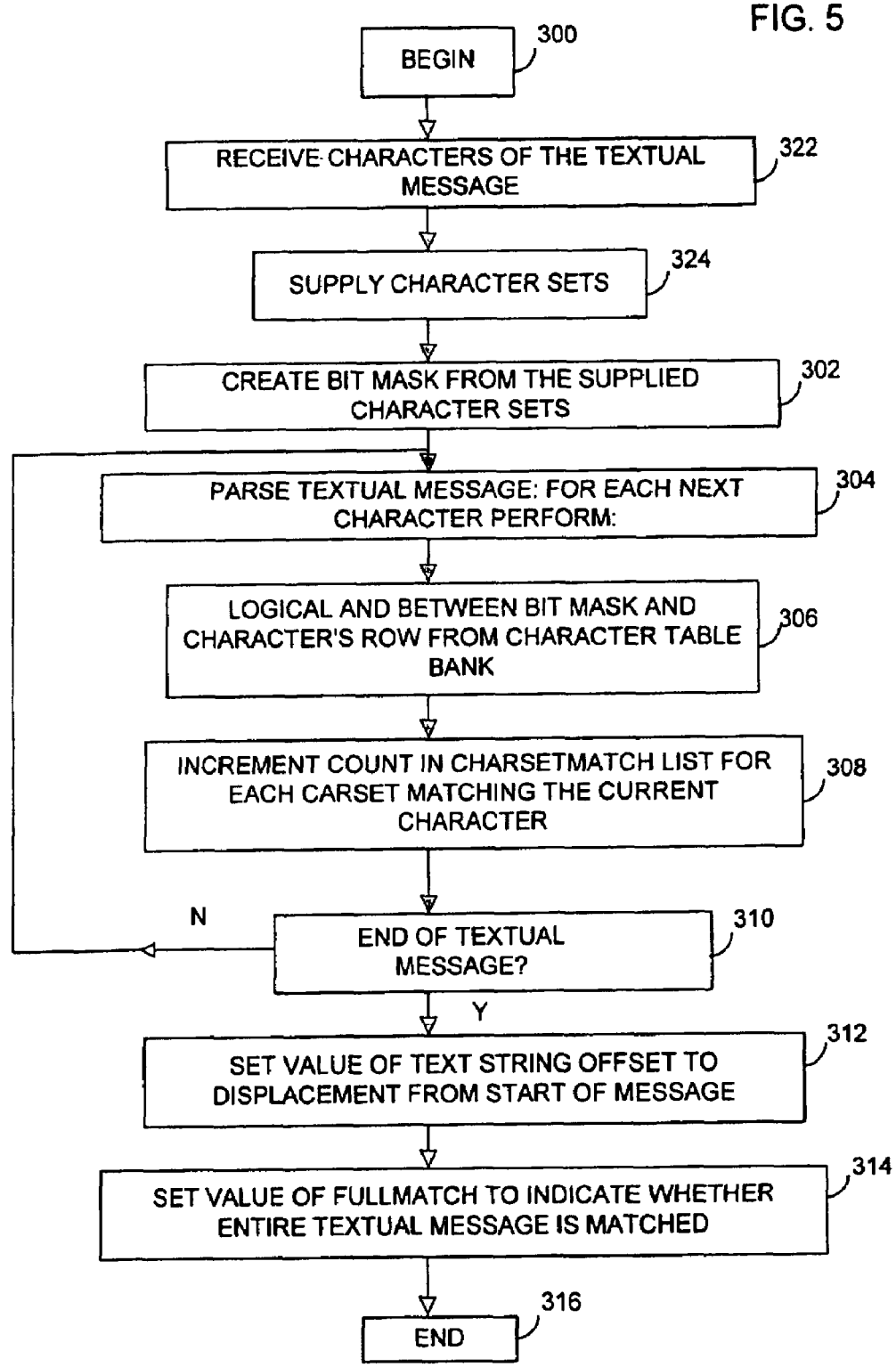
FIG. 5 is a flowchart illustrating character set processing according to a second embodiment of the invention.

The function EvaluateTextMessageWithCount invokes the following processing steps, illustrated in FIG. 5. Processing begins in step 300. Characters of a textual message are received in step 322. Character sets are supplied for the characters of the textual message in step 324. In step 302, a bit mask is created from the character sets supplied in the parameter CharSetTestList. Again, this mask has the same correspondence between columns and character sets as the character table bank 110. In step 304, parsing of the textual message 116 is begun. For each character, in step 306 a logical AND is performed between the bit masks of CharSetTestList and the value returned from the character's row of character table bank 110, in the manner illustrated in FIG. 3.

In step 308, the results of the logical AND operation are stored by incrementing a corresponding count parameter in CharSetMatchList for each matching character set. These steps are repeated until the end of message test (as above) of step 310 is reached. In step 312, the current position in the textual message string (displacement from the start) is stored in the TextStringOffsetPosition parameter. In step 314, the FullMatch parameter is returned, indicating either a full match of the supplied textual message 116 to one or more character sets (logical 1), or not (logical 0, less than all of the message string could be encoded). After the entire textual message 116 is parsed, the count parameter for each character set in CharSetMatch list reflects the total number of matches that set contains for that message. In step 316, processing ends.

In another embodiment of the invention, the invention makes a normative decision concerning the character set which best matches the characters of the textual message 116. A corresponding API is presented in the following Table 4, which differs from the functionality above in Tables 2 and 3 in that it returns the number of characters that can be encoded in each of the partially matching character sets. The invention then automatically chooses the character set that best represents the given textual message 116. One purpose of this embodiment is to provide a utility whereby multilingual data can be sent with least possible information loss, when circumstances prevent the use of a universal character set or a multi-part mail message.

TABLE 4

Funct EvaluateTextMessageWithBestMatch: (TextString, TextStringLength, CharSetTestList,CharSetMatchList, CharSet WeightList, BestMatchCharSet, TextStringOffsetPosition, MatchStatus)

The foregoing arguments in general relate to:
TextString: Contains the textual message to be tested
TextStringLength: The length of the string, in bytes or characters, or an indication that the textual message is NULL-terminated.
CharSetTestList: A list of character sets against which the textural message is to be matched. the number of character sets in the list is determined by a terminator mark.
CharSetMatchList: An empty list in which the matching results are stored.
CharSetWeightList: A list of relative weights to be assigned to different character sets when performing evaluation.
BestMatchCharSet: An indicator of which of the CharSetTestList provides the best weighted fit to the supplied textual message.
TextStringOffsetPosition: An offset initialized to zero where the function returns the position in the string if the scan fails.
MatchStatus: a boolean value indicating whether all characters were matched (logical 1, success) or less than all were matched (logical 0, failure).

Figure 6:
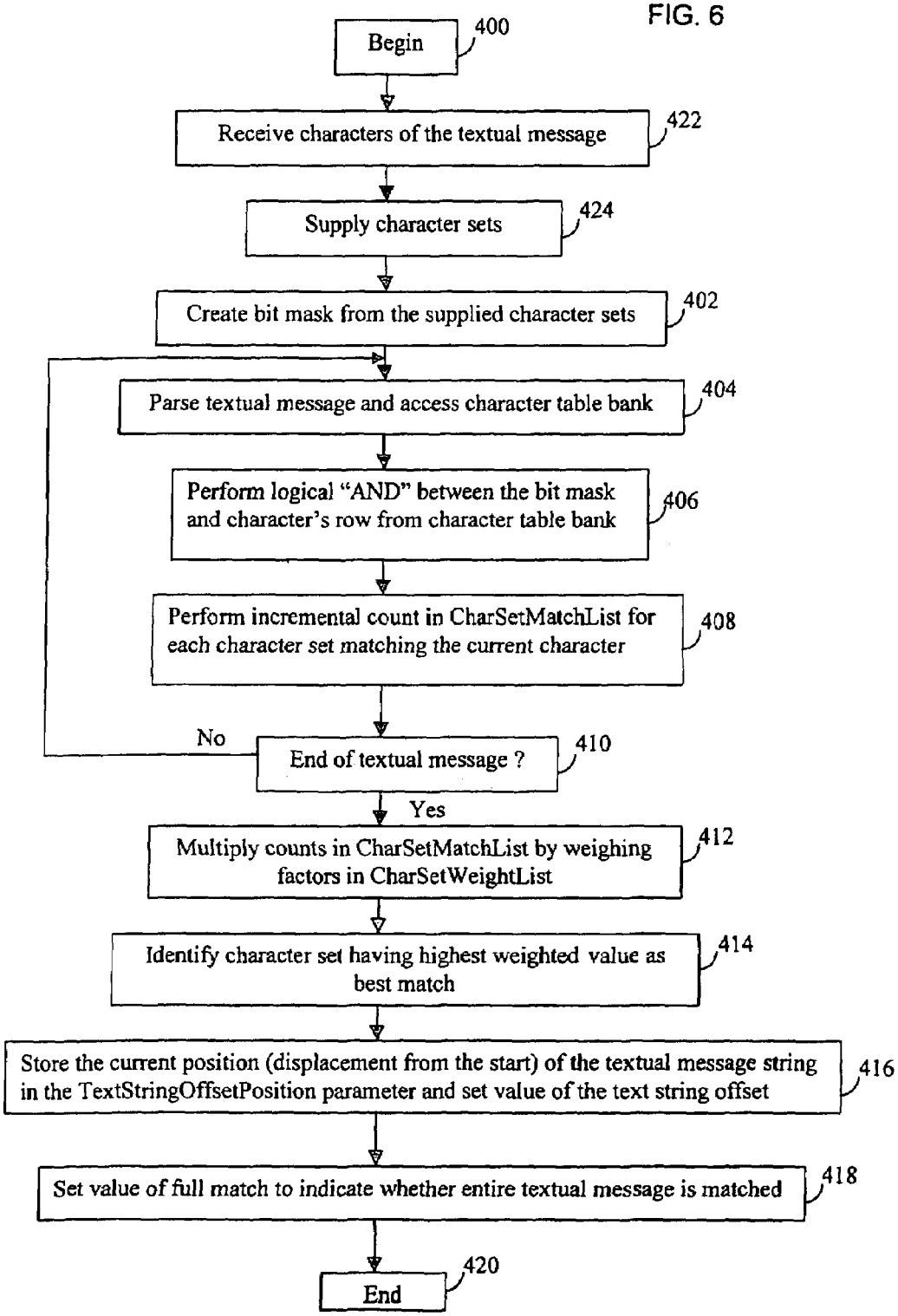
FIG. 6 is a flowchart illustrating character set processing according to a third embodiment of the invention.

The function invokes the following processing steps, illustrated in FIG. 6. Processing begins in step 400. Characters of a textual message are received in step 422. Character sets are supplied for the characters of the textual message in step 424. In step 402, as above a bit mask is created from the character sets supplied in the parameter CharSetTestList. Again, this mask has the same correspondence between columns and character sets as the character table bank 110. In step 404, the parsing of textual message 116 is begun. For each character, in step 406 a logical AND is performed between the bit masks of CharSetTestList and the value returned from the character's row of character table bank 110. In step 408, the results of the logical AND operation are stored by incrementing a corresponding count for each matching character set in CharSetMatchEist. These steps are repeated until the end of the textual message 116 has been reached at the end of message test (as above) of step 410.

In step 412, the totals in the CharSetMatch list are multiplied by the corresponding weights contained in the CharSetWeightList, to generate a weighted match total. The CharSetWeightList takes into account Han unification, in which the ideographic characters used in China, Taiwan, Japan and Korea are mapped to the same codepoint in Unicode, even though these may have slightly different visual representations in each of the countries. In other words, the visual variants have been unified to a specific single binary representation for these languages.

In step 414, the character set having the highest total after these calculations is identified and stored in the parameter BestMatchCharSet as the best match to the textual message 116. In step 416, the current position in the textual message string (displacement from the start) is stored in the TextStringOffsetPosition parameter. In step 418, the FullMatch parameter is returned, indicating either a full match of the supplied textual message 116 to one or more character sets (logical 1), or not (logical 0, less than all of the message string could be encoded). In step 420, processing ends.

The invention in one implementation finds application in the Lotus Notes™/Domino™ environment, for a variety of textual functions. In one respect, the Notes™ client application stores/processes messages in a multilingual character set (Unicode or LMBCS). When these are sent to the Internet, this internal character set must be converted to the appropriate character set for use on the Internet. The logic executed by the invention as described herein can tell the Notes™ client which character set should be used, based on the content of the message.

Sometimes Unicode messages arrive directly from the Internet to a client application. Notes™ converts these messages into an internal character set, but must know which language is used in the message. Applying the logic of this invention, if the message can be well represented in a Korean character set, a client application can assume that it is a Korean message. This allows Notes™ for instance to accurately encode the message in its internal Korean character set.

Notes™ and other client applications can also enhance full text search features using the logic of the invention in at least two ways. First, the invention in this regard can be used to create a search index. The search engine in Lotus Notes™ depends on an associated codepage representing each document that is to be indexed. The invention can indicate the most appropriate character set to or sets assign to a codepage to use for this indexing, based on the character set that can best represent it.

Second, in terms of executing searches the Notes™ search engine stores index information into several indices for each codepage. When a query is executed, the query string is processed according to the invention to determine the character set that should be used, thereby dictating which index (or indices) to search. For example, if the query string is in English, all indices are searched. (Again, the reason for assuming that English is in all indices is because ASCII, which can be used to encode all English, is a subset of all the character sets currently supported). However, if the query string is in Greek, the search may be restricted to the Greek index for only documents containing that character set. These commercial embodiments and client implementations are exemplary, and many others are contemplated through the character set evaluation technology of the invention.

The invention also contemplates the preparation and storage of computer software in a machine-readable format such as a floppy or other magnetic, optical or other drive, which upon execution carries out the character set evaluation actions of the invention.

The foregoing description of the system and method of the invention is illustrative, and variations in implementation and configuration will occur to persons skilled in the art. For instance, while the invention has been described as decoding a received textual email message, many other varieties of messages, including alphanumeric pages, wireless telephony, teletype and others may be evaluated according to the principles of the invention. Character set processing according to the invention moreover can be carried out locally in a client workstation, remotely on a server or in other manners and on other suitable hardware. The scope of the invention is accordingly intended to be limited only by the following claims.

What is claimed is:

1. A computer implemented method of evaluating characters in an inputted search string to generate a search index, comprising the steps of:
   a) accepting an input of the characters of the search string, wherein the characters can be represented in any of a plurality of character sets corresponding to an undetermined language;
   b) evaluating the search string by comparing each of the characters of the search string to a plurality of pre-determined candidate character sets to determine one or more matches between the plurality of pre-determined candidate character sets and the search string; and
   c) generating the search index by assigning character sets to a code page, wherein the character sets are assigned based on he results of the evaluation of the charcters of the search string and the plurality of pre-determined candidate character sets that correspond to the characters of the search string.

2. The method of claim 1, wherein the comparing of step (b) comprises the step of comparing each character of the search string to an entry for each of the candidate character sets if a character table bank.

3. The method of claim 2, wherein the step of comparing each character comprises the step of testing the ability of each candidate character set to express that character by performing a logical mask between a universal code for that character and an indicator in the character table bank indicating whether each of the candidate character sets contains that character.

4. The method of claim 3, wherein the universal code is Unicode.

5. The method of claim 1, further comprising the step of(d) computing a total number of characters matched to each of the candidate character sets.

6. The method of claim 1, further comprising the step of (e) selecting a best match based upon the total number of characters matched to each of the candidate character sets.

7. The method of claim 1, further comprising the step of (f) evaluating the characters of a query string.

8. The method of claim 7, further comprising the step of (g) performing a search of the query string against search indices whose character set matches the character set of the query string.

9. A computer implemented system for evaluating characters in an inputted search string to generate a search index, comprising:
   an input interface to accept an input of the characters of the search string, wherein the characters can be represented in any of a plurality of character sets corresponding to an undetermined language; and
   a processor unit, connected to the input interface, the processor unit evaluating the search string by comparing each of the characters of the search string to a plurality of pre-determined candidate character sets to determine one or more matches between the plurality of pre-determined candidate character sets and the search string, and generating the search index by assigning character sets to a code page, wherein the character sets are assigned based on the results of the evaluation of the characters of the search string and the plurality of pre-determined candidate character sets that correspond to the characters of the search string.

10. The system of claim 9, wherein the processor unit compares each character of the search string to an entry for each of the candidate character sets in a character table bank.

11. The system of claim 10, wherein the processor unit tests the ability of each candidate character set to express that character by performing a logical mask between a universal code for that character and an indicator in the character table bank indicating whether each of the candidate character sets contains that character.

12. The system of claim 11, wherein the universal code is Unicode.

13. The system of claim 9, wherein the processor unit computes a total number of characters matched to each of the candidate character sets.

14. The system of claim 9, wherein the processor unit selects a best match based upon the total number of characters matched to each of the candidate character sets.

15. The system of claim 9, wherein the processor unit evaluates the characters of a query string.

16. The system of claim 15, wherein the processor unit performs a search of the query string against search indices whose character set matches the character set of the query string.

17. A computer implemented system for evaluating characters in an inputted search string to generate a search index, comprising:
 input interface means to accept an input of the characters of the search string, wherein the characters can be represented in any of a plurality of character sets corresponding to an undetermined language; and
 processor means, connected to the input interface means, the processor means evaluating the search string by comparing each of the characters of the search string to a plurality of pre-determined candidate character sets to determine one or more matches between the plurality of pre-determined candidate character sets and the search string, and generating the search index by assigning character sets to a code page, wherein the character sets are assigned based on the results of the evaluation of the characters of the search string and the plurality of pre-determined candidate character sets that correspond to the characters of the search string.

18. The system of claim 17, wherein the processor means compares each character of the search string to an entry for each of the candidate character sets in a character table bank.

19. The system of claim 18, wherein the processor means tests the ability of each candidate character set to express that character by performing a logical mask between a universal code for that character and an indicator in the character table bank indicating whether each of the candidate character sets contains that character.

20. The system of claim 19, wherein the universal code is Unicode.

21. The system of claim 17, wherein the processor means computes a total number of characters matched to each of the candidate character sets.

22. The system of claim 17, wherein the processor means selects a best match based upon the total number of characters matched to each of the candidate character sets.

23. The system of claim 17, wherein the processor means evaluates the characters of a query string.

24. The system of claim 23, wherein the processor means performs a search of the query string against search indices whose character set matches the character set of the query string.

25. A computer implemented storage medium for storing machine readable code, the machine readable code being executable to evaluate characters in an inputted electronic search string according to the steps of:
 a) accepting an input of the characters of the search string, wherein the characters can be represented in any of a plurality of character sets corresponding to an undetermined language;
 b) evaluating the search string by comparing each of the characters of the search string to a plurality of pre-determined candidate character sets to determine one or more matches between the plurality of pre-determined candidate character sets and the search string; and
 c) generating the search index by assigning character sets to a code page, wherein the character sets are assigned based on the results of the evaluation of the characters of the search string and the plurality of pre-determined candidate character sets that correspond to the characters of the search string.

26. The storage medium of claim 25, wherein the comparing of step (b) comprises the step of comparing each character of the search string to an entry to each of the candidate character sets in a character table bank.

27. The storage medium of claim 26, wherein the step of comparing each character comprises the step of testing the ability of each candidate character set to express that character by performing a logical mask between a universal code for that character and an indicator in the character table bank indicating whether each of the candidate character sets contains that character.

28. The storage medium of claim 27, wherein the universal code is Unicode.

29. The storage medium of claim 25, wherein the steps further comprise the step of (d) computing a total number of characters matched to each of the candidate character sets.

30. The storage medium of claim 25, wherein the steps further comprise the step of (e) selecting a best match based upon the total number of characters matched to each of the candidate character sets.

31. The storage medium of claim 25, wherein the steps further comprise the step of (f) evaluating the characters of a query string.

32. The storage medium of claim 31, wherein the steps further comprise the step of (g) performing a search of the query string against search indices whose character set matches the character set of the query string.

33. A computer implemented method of evaluating characters in an inputted search string to generate a search index, comprising the steps of:
 a) accepting an input of the characters of the search string, wherein the characters can be represented in any of a plurality of character sets corresponding to an undetermined language;
 b) evaluating the search string by comparing each of the characters of the search string to a plurality of pre-determined candidate character sets to determine one or more matches between the plurality of pre-determined candidate character sets and the search string, wherein each of the characters of the search string are compared to one or more character sets of a character bank by parsing the characters of the search string and identifying the one or more character sets of the character bank that express each of the characters of the search string, wherein each of the character sets represented in the character bank that correspond to each of the characters of the search string are compared to preselected character set indicators of a bit mask to determine a match between each of the character sets represented in the character bank that correspond to the characters of the search string and the characters set indicators of the bit mask, wherein a first column of the character bank corresponds to a first column of the bit mask, and wherein the first column of the character bank and the first column of bit mask correspond to the same character set; and c) generating a search index based on the results of the evaluation of the search string and the plurality of pre-determined candidate character sets.

34. A computer implemented method of evaluating characters in an inputted search string against a character table bank comprising a predetermined number of columns that correspond to a plurality of pre-determined candidate character sets in order to provide enhanced full text search features, the method comprising:

accepting the inputted search string having at least one character;

comparing the at least one character of the inputted search string to the plurality of pre-determined candidate character sets;

filling the columns of the character table bank to indicate whether or not the at least one character of the string is supported by corresponding pre-determined candidate character sets;

creating a bit mask comprising columns equivalent in number to the number of columns in the character table bank;

filling the columns of the bit mask to provide an indication of the plurality of pre-determined character sets against which the filled columns of the character table bank are to be matched;

evaluating the search string by comparing the filled character table bank against the filled columns of the bit mask; and generating a search index based on the results of the evaluation.

35. A computer implemented system for evaluating characters in an inputted search string against a character table bank comprising a predetermined number of columns that correspond to a plurality of pre-determined candidate character sets in order to provide enhanced full text search features, the system comprising:

an accepting module that accepts the inputted search string having at least one character;

a comparing module that compares the at least one character of the inputted search string to the plurality of pre-determined candidate character sets;

a bank filling module that fills the columns of the character table bank to indicate whether or not the at least one character of the string is supported by corresponding pre-determined candidate character sets;

a creating module that creates a bit mask comprising columns equivalent in number to the number of columns in the character table bank;

a mask filling module that fills the columns of the bit mask to provide an indication of the plurality of pre-determined character sets against which the filled columns of the character table bank are to be matched;

an evaluating module that evaluates the search string by comparing the filled character table bank against the filled columns of the bit mask; and an index generating module that generates a search index based on the results of the evaluation.

36. A computer implemented system for evaluating characters in an inputted search string against a character table bank comprising a predetermined number of columns that correspond to a plurality of pre-determined candidate character sets in order to provide enhanced full text search features, the system comprising:

accepting means that accepts the inputted search string having at least one character;

comparing means that compares the at least one character of the inputted search string to the plurality of pre-determined candidate character sets;

bank filling means that fills the columns of the character table bank to indicate whether or not the at least one character of the string is supported by corresponding pre-determined candidate character sets;

creating means that creates a bit mask comprising columns equivalent in number to the number of columns in the character table bank;

mask filling means that fills the columns of the bit mask to provide an indication of the plurality of pre-determined character sets against which the filled columns of the character table bank are to be matched;

evaluating means that evaluates the search string by comparing the filled character table bank against the filled columns of the bit mask; and index generating means that generates a search index based on the results of the evaluation.

37. A computer implemented storage medium for storing machine readable code, the machine readable code being executable to evaluate characters in an inputted search string against a character table bank comprising a predetermined number of columns that correspond to a plurality of pre-determined candidate character sets in order to provide enhanced full text search features, the method comprising:

accepting the inputted search string having at least one character;

comparing the at least one character of the inputted search string to the plurality of pre-determined candidate character sets;

filling the columns of the character table bank to indicate whether or not the at least one character of the string is supported by corresponding pre-determined candidate character sets;

creating a bit mask comprising columns equivalent in number to the number of columns in the character table bank;

filling the columns of the bit mask to provide an indication of the plurality of pre-determined character sets against which the filled columns of the character table bank are to be matched;

evaluating the search string by comparing the filled character table bank against the filled columns of the bit mask; and generating a search index based on the results of the evaluation.

* * * * *